United States Patent
Santoro et al.

(10) Patent No.: US 10,126,792 B2
(45) Date of Patent: Nov. 13, 2018

(54) POWER CONVERTER LOAD CURRENT CONTROL

(71) Applicant: Texas Instruments Incorporated, Dallas, TX (US)

(72) Inventors: Francesco Silvio Santoro, Munich (DE); Ralf Peter Brederlow, Poing (DE); Neil Gibson, Freising (DE); Rüdiger Kuhn, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 183 days.

(21) Appl. No.: 14/956,319

(22) Filed: Dec. 1, 2015

(65) Prior Publication Data

US 2017/0126124 A1    May 4, 2017

Related U.S. Application Data (60) Provisional application No. 62/250,503, filed on Nov. 3, 2015.

(51) Int. Cl.
*G06F 1/26* (2006.01)
*H02M 3/158* (2006.01)

(52) U.S. Cl.
CPC .............. *G06F 1/26* (2013.01); *H02M 3/158* (2013.01)

(58) Field of Classification Search
CPC .............................. G06F 1/26; H02M 3/1585
USPC ......................................................... 713/300
See application file for complete search history.

(56) References Cited

U.S. PATENT DOCUMENTS

| | | | | |
|---|---|---|---|---|
| 5,053,937 A * | 10/1991 | Blockl | ................ | H02M 3/3376 363/16 |
| 6,137,275 A * | 10/2000 | Ravon | ..................... | G05F 1/575 323/274 |
| 8,283,907 B1 * | 10/2012 | Jayaraj | .................. | H02M 3/156 323/282 |
| 8,427,113 B2 * | 4/2013 | Xing | ..................... | H02J 7/0065 320/140 |
| 8,797,010 B2 * | 8/2014 | Dowlatabadi | ........... | H02M 1/36 323/284 |
| 2005/0083025 A1 * | 4/2005 | Brown | .................. | H02M 3/158 323/283 |
| 2005/0206358 A1 * | 9/2005 | Van Der Horn | ...... | H02M 3/156 323/282 |

(Continued)

OTHER PUBLICATIONS

Naeim Safari , "Design of a DC/DC buck converter for ultra-low power applications in 65nm CMOS Process", Linköping Institute of Technology , pp. 14-15, & 34.*

*Primary Examiner* — Dennis M Butler
*Assistant Examiner* — Santosh R Poudel
(74) *Attorney, Agent, or Firm* — Kenneth Liu; Charles A. Brill; Frank D. Cimino (57) ABSTRACT

A power conversion system includes a maximum load current controller that is operable to limit a load current. For example, in a power conversion system operating in a discontinuous conduction mode (DCM), the maximum load current controller limits the load current by determining an idle period in an active cycle for power switches of the maximum load current controller. The maximum load current controller is optionally operable to approximate values for the time idle period that are substantially equal to theoretically calculated values.

14 Claims, 6 Drawing Sheets

(56) References Cited

U.S. PATENT DOCUMENTS

| | | | | |
|---|---|---|---|---|
| 2008/0061758 A1* | 3/2008 | Nishida | ............... | H02M 3/156 323/284 |
| 2008/0094861 A1* | 4/2008 | Wang | ................. | H02M 3/156 363/21.11 |
| 2008/0197828 A1* | 8/2008 | Michishita | ............ | H02M 3/156 323/282 |
| 2012/0074861 A1* | 3/2012 | Lowenthal | ......... | H05B 33/0815 315/244 |
| 2013/0002141 A1* | 1/2013 | Lee | ................... | H05B 33/083 315/152 |
| 2013/0063984 A1* | 3/2013 | Sandner | ............... | H02M 1/38 363/20 |
| 2014/0097813 A1* | 4/2014 | Dally | ................ | H02M 3/158 323/272 |
| 2014/0117951 A1* | 5/2014 | Dally | ................ | H02M 3/158 323/266 |
| 2015/0091544 A1* | 4/2015 | Jayaraj | ............... | H02M 3/156 323/284 |
| 2015/0181675 A1* | 6/2015 | Lochmann | ......... | H05B 33/0815 315/291 |
| 2015/0303816 A1* | 10/2015 | Tumminaro | ............ | H02M 1/08 363/21.04 |
| 2016/0118887 A1* | 4/2016 | Zhang | ................ | H02M 3/158 323/271 |

\* cited by examiner

POWER CONVERTER LOAD CURRENT CONTROL

CLAIM OF PRIORITY

This application for patent claims priority to U.S. Provisional Application No. 62/250,503 entitled "POWER CONVERTER LOAD CURRENT CONTROL" filed Nov. 3, 2015 in the United States Patent and Trademark Office, wherein the application listed above is hereby fully incorporated by reference herein for all purposes.

BACKGROUND

The amount of power consumed by electronic devices often limits the utility of the electronic devices, especially for electronic devices having limited power sources (such as batteries, capacitors, solar cells, and the like). Because the rates of power consumption within a single electronic device typically vary over time, it can be difficult to determine efficiently to efficiently produce various amounts of power for consumption by various electronic devices at various points of time during operation an electronic device. Measurement and/or estimation of the power consumption of electronic devices is often determined by using sensing components that entail higher cost and/or higher power consumption.

SUMMARY

The problems noted above can be solved in a power conversion system that includes a maximum load current controller that is operable to limit a load current. For example, in a power conversion system operating in a discontinuous conduction mode (DCM), the maximum load current controller limits the load current by determining an idle period in an active cycle for power switches of the maximum load current controller. The maximum load current controller is optionally operable to approximate values for the time idle period that are substantially equal to theoretically calculated values.

Accordingly, the power transfer estimation can be determined without an optional (e.g., single-purpose) sensing element, which avoids power consumption on the part of the sensing element to measure power transference. The power transfer estimation can be performed periodically over the periods of time to provide an estimate of power remaining in a limited power source regardless of the operating mode of the power converter. The power transfer estimator is optionally operable to measure the inductance of the inductor through which power is transferred from the input to the output of the power converter.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion. The term "calibration" can include the meaning of the word "test." The term "input" can mean either a source or a drain (or even a control input such as a gate where context indicates) of a PMOS (positive-type metal oxide semiconductor) or NMOS (negative-type metal oxide semiconductor) transistor. The term "pulse" can mean a portion of waveforms such as "squarewave" or "sawtooth" waveforms.

Figure 1:
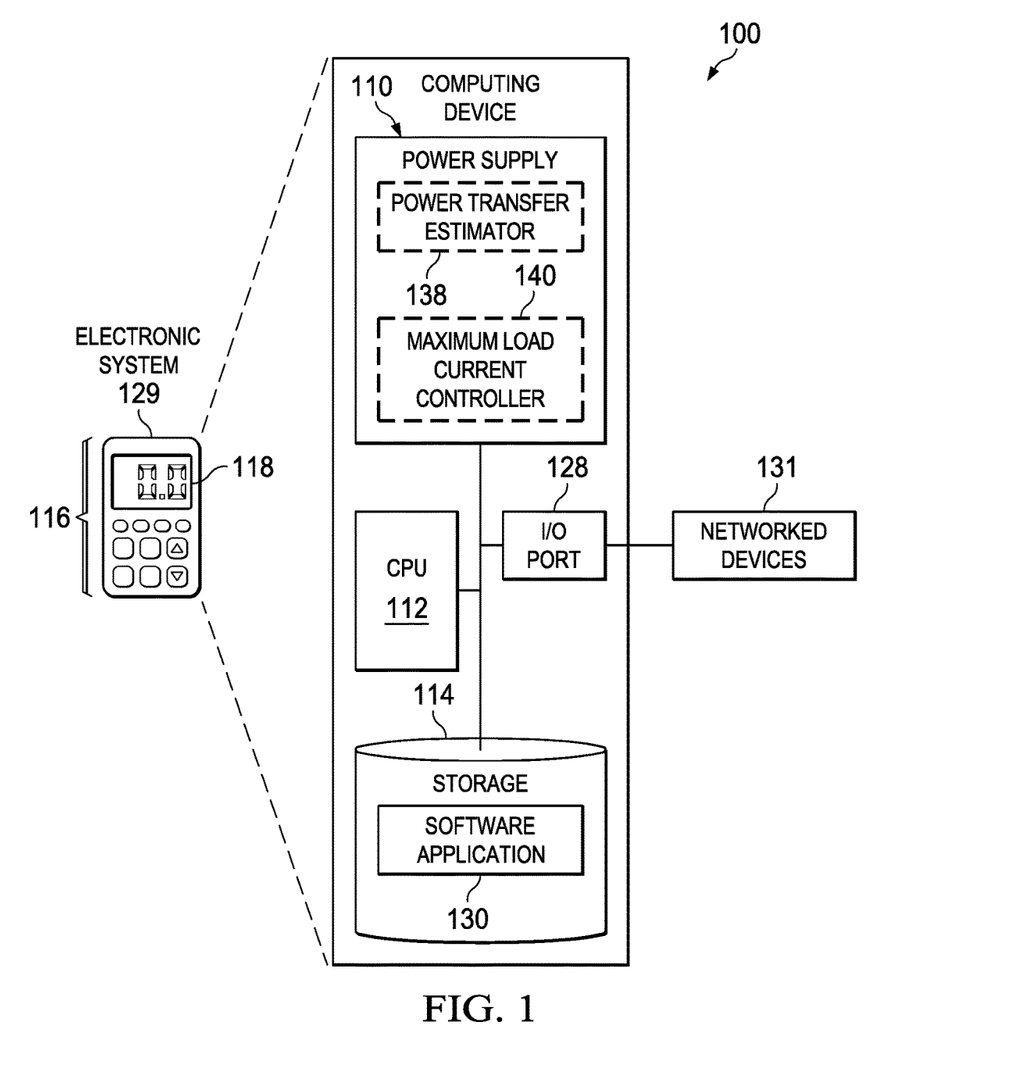
FIG. 1 shows an illustrative electronic device in accordance with example embodiments of the disclosure.

FIG. 1 shows an illustrative computing device 100 in accordance with embodiments of the disclosure. For example, the computing device 100 is, or is incorporated into, or is coupled (e.g., connected) to an electronic system 129, such as a computer, electronics control "box" or display, communications equipment (including transmitters or receivers), or any type of electronic system operable to process information.

In some embodiments, the computing device 100 comprises a megacell or a system-on-chip (SoC) which includes control logic such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing device 100. The processor is arranged to execute code for transforming the processor into a special-purpose machine having the structure of—and for performing the teachings of—the instant disclosure.

The CPU 112 comprises memory and logic that store information frequently accessed from the storage 114. The computing device 100 is often controlled by a user using a UI (user interface) 116, which provides output to and receives input from the user during the execution of the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like.

The CPU 112 and power supply 110 are coupled to I/O (Input-Output) port 128, which provides an interface that is configured to receive input from (and/or provide output to) networked devices 131. The networked devices 131 can include any device (including test equipment) capable of point-to-point and/or networked communications with the computing device 100. The computing device 100 is often coupled to peripherals and/or computing devices, including tangible, non-transitory media (such as flash memory) and/or cabled or wireless media. These and other input and output devices are selectively coupled to the computing device 100 by external devices using wireless or cabled connections. The storage 114 is accessible, for example, by the networked devices 131. The CPU 112, storage 114, and power supply 110 are also optionally coupled to an external power supply (not shown), which is configured to receive power from a power source (such as a battery, solar cell, "live" power cord, inductive field, fuel cell, capacitor, and the like).

The power supply 110 comprises power generating and control components for generating power to enable the computing device 100 to execute the software application 130. For example, the power supply 110 provide one or more power switches, each of which can be independently controlled, that supply power at various voltages to various components of the computing device 100. The power supply 110 is optionally in the same physical assembly as computing device 100, or is coupled to computing device 100. The computing device 100 optionally operates in various power-saving modes wherein individual voltages are supplied (and/or turned off) in accordance with a selected power-saving mode and the various components arranged within a specific power domain.

The power supply 110, for example, includes a power transfer estimator 138 and a maximum load current controller 140. Although the power transfer estimator 138 and the maximum load current controller 140 are illustrated as being included in the power supply 110 or as a single (e.g., logical) unit, various portions of the power transfer estimator 138 are optionally included in the same module (e.g., as formed by a die as produced in semiconductor manufacturing) or in different modules.

The power supply 110 is in various embodiments a switched-mode power supply (e.g., "converter") that alternately stores and outputs energy. Such converters typically receive either a DC (direct current) or rectified AC (alternating current) voltage as an input voltage. Energy derived from the input voltage is temporarily stored in energy storage devices (such as an inductors and capacitors) during each switching cycle. The power switch in the converter is actuated (e.g., opened for a "turned on" state or closed for a "turned off" state) to control the amount of energy that is output. A filter is normally used to reduce ripple in the output DC voltage and current. Depending on the topology selected for the converter, the output DC voltage can be higher or lower than the input voltage. The output DC voltage can also be inverted with respect to the input voltage.

Switching converters typically operate in either a discontinuous mode or a continuous mode. In the discontinuous mode, converters completely de-energize the energy storage devices before the end of every switching cycle. Accordingly, no current flows in the energy storage devices at the start of every switching cycle in the discontinuous mode. In the continuous mode, converters normally do not completely de-energize the energy storage devices before the end of every switching cycle. Accordingly, the current in the energy storage devices operating in a continuous mode normally does not reach a point where current does not flow in the energy storage devices.

The discontinuous inductor current conduction mode (DCM) is a power mode that is used to improve light load efficiency in switching power converters. Because many computing devices 100 typically operate in applications that present electrical loads that are in the light-to-medium load current range, the light-load efficiency of voltage regulators has a substantial impact of the power efficiency of a system.

The output of a converter is determined in part by the duty ratio. The duty ratio is the time period in which the switch is "on" divided by the time period of the switching cycle (e.g., in accordance with the equation: $D=Ton/Tp$). The switching cycle time period is typically equal to the time period the switch is "on" plus the time period in which the switch is "off" and plus any time period in which the switch is "idle" (where $Tp=Ton+Toff+Tidle$; as discussed below with respect to FIG. 3). The output voltage of the converter is theoretically equal to the input voltage multiplied by the duty ratio (e.g., in accordance with the equation: $Vout=Vin*D$). The ranges of values of Ton and Toff are typically selected during design time (e.g., to enhance operating stability while operating with the feedback control signals).

In one example, the power supply 110 is a DC-DC converter operable to operate in a discontinuous conduction mode (DCM). The power supply 110 includes a power transfer estimator 138 that is operable to determine a cumulative amount of power transferred through the power supply 110. The power supply 110 also includes the maximum load current controller 140 for limiting and controlling the maximum current delivered to the load. (In various embodiments, the teachings disclosed herein can be applied to virtually all PFM (pulse frequency modulated) controllers of synchronous buck converters.)

At any given point in time (e.g., represented by (t)) the power flowing through a power supply 110 can be represented as: P(t)=V(t)*I(t). In conventional systems, for example, direct measurements of current are often performed by measuring the voltage developed across a current sensor (e.g., a resistor) coupled in series with the output node of the power supply 110. Sensor elements (such as the in-series resistors) generate additional heat and increase cost. Accordingly the use of the current sensor elements increases overall power consumption and reduces the overall efficiency of the system incorporating the current sensor.

Figure 2:
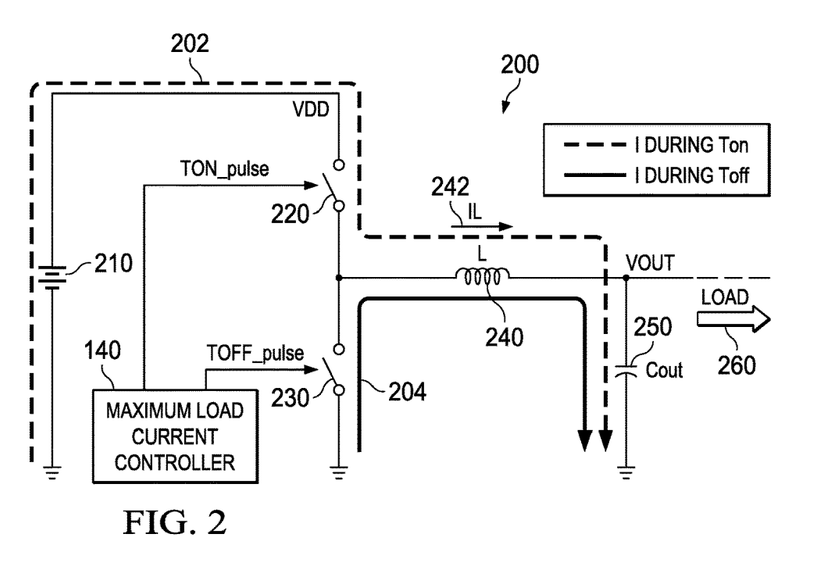
FIG. 2 is a schematic diagram of a power transfer estimator in accordance with example embodiments of the disclosure.

FIG. 2 is a schematic diagram illustrating the operation and topology of a maximum current controlled buck converter in accordance with example embodiments of the disclosure. Maximum current controlled buck converter 200 includes, for example, the maximum load current controller 140 of FIG. 1.

The maximum load current controller 140 is operable to control the source of and amount of current flow (IL) 242 through an energy storage device such as the inductor (I) 240. For example, the maximum load current controller 140 is operable to close switch 220 for an ON time period (TON) by asserting a TON_pulse at a control terminal of the switch 220. When the switch 220 is closed, current 202 flows from power source 210, through switch 220, and through inductor 240 to an output voltage node (VOUT) to which a filter/decoupling capacitor (Cout) 250 is coupled. A load 260 (e.g., when present) is coupled electrically in parallel with the capacitor 250. Accordingly, the current 202 is sourced by power source 210 and a portion of the current 202 is reactively coupled to ground through the capacitor 250 when the switch 220 is closed.

The current 204 is sourced by closing switch 230 (e.g., while switch 220 is open). For example, the maximum load current controller 140 is operable to close switch 230 for an OFF time period (TOFF) by asserting a TOFF pulse at a control terminal of the switch 230. When the switch 230 is closed, the current 204 flows from ground, through switch 230, and through inductor 240 to the output voltage node (VOUT) to which a filter/decoupling capacitor (Cout) 250 is coupled. A load 260 (e.g., when present) is coupled electrically in parallel with the capacitor 250. Accordingly, a portion of the current 204 is reactively coupled to ground through the capacitor 250.

Figure 3:
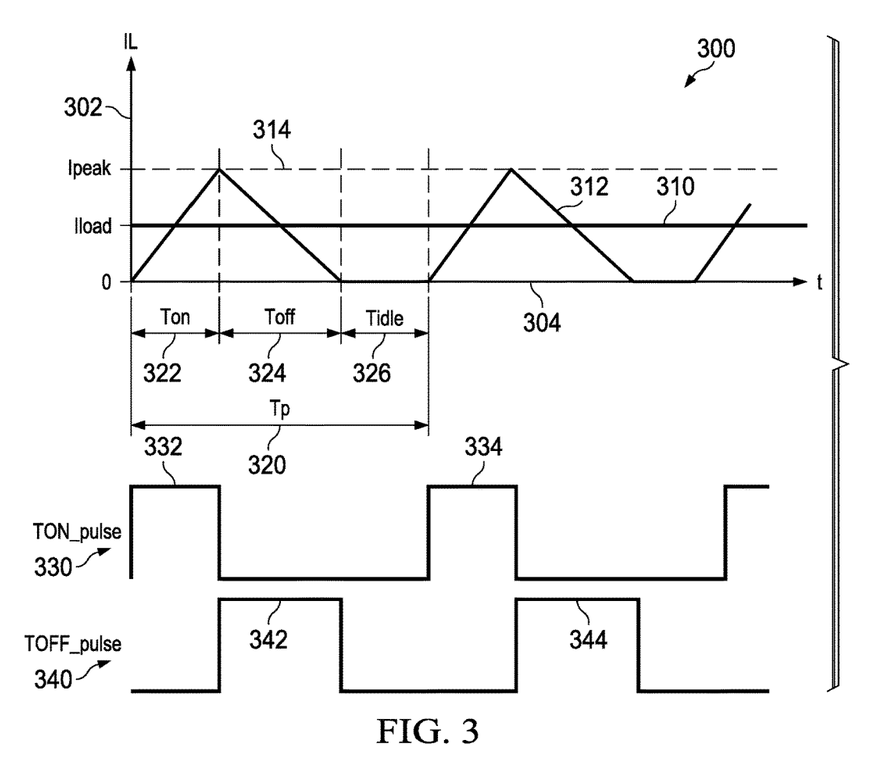
FIG. 3 is a waveform diagram illustrating the inductor current waveform of a maximum current controlled buck converter in accordance with example embodiments of the disclosure.

FIG. 3 is a waveform diagram illustrating the inductor current waveform of a maximum current controlled buck converter in accordance with example embodiments of the disclosure. Generally described, waveform diagram 300 illustrates a waveform 312 of a power converter operating in a discontinuous power mode. Waveform 312 illustrates an inductor current such as the current through the inductor 240 (FIG. 2) over repeating operating cycles, where the vertical axis represents the magnitude of the current through an inductor and the horizontal axis 304 represents time.

Each operating cycle occurs during a time period (Tp) 320. Each time period 320 includes a time on (Ton) period 322, a time off (Toff) period 324, and a time idle (Tidle) period. During the Ton period 322, TON_pulse 332 (and 334) is asserted, and the current increases from a zero point to a current peak (Ipeak). During the Toff period 324, the TOFF_pulse 342 (and 344) is asserted and the current decreases from Ipeak to the zero point. During the Tidle time period 326, the current remains at the zero point. The value of Ipeak 314 can be predetermined (e.g., at design time or during a period of operation of the power converter before the power transfer estimation circuitry is activated).

By visual inspection it can be observed that there is no apparent direct correlation between the DC load current 310 (e.g., which is the current sunk by the load 260) and the inductor current. In contrast, a buck converter system working in a CCM (Continuous Conduction Mode) has a more direct correlation because the inductor current in the CCM normally presents a DC component.

As disclosed herein, the maximum load current is current limited in response to a controlled modulation of T_IDLE 326. For example, the T_IDLE 326 occurs after the switch 230 is toggled open and before the switch 220 is toggled closed. Modulating (e.g., varying) the duration of T_IDLE 326 can be used to increase or decrease (e.g., control) the current flowing through the inductor 240. It can be observed in FIG. 3 that the relationship between the load current 310 and the inductor current 312 can be expressed as is the following:

$$I_{LOAD} = \left(\frac{I_{PEAK}}{2}\right) * \frac{T_{ON} + T_{OFF}}{T_{ON} + T_{OFF} + T_{IDLE}} \quad (1)$$

Solving for $T_{IDLE}$ as a function of the load current $I_{LOAD}$, Eq. (1) can be expressed as:

$$I_{IDLE} = \frac{I_{PEAK} - 2I_{LOAD}}{2I_{LOAD}}(T_{ON} + T_{OFF}) \quad (2)$$

Considering the operation of a synchronous buck converter in DCM discussed above, the relationship between the input voltage $V_{DD}$ (also referred to as $V_{IN}$), the output regulated voltage $V_{OUT}$ the inductor peak current $I_{PEAK}$ and the $T_{ON-OFF}$ can be expressed as:

$$\frac{V_{DD} - V_{OUT}}{L}T_{ON} = \quad (3)$$

$$I_{PEAK} \left\| \frac{V_{OUT}}{L}T_{OFF} = I_{PEAK} \right\| T_{OFF} = T_{ON}\frac{V_{DD} - V_{OUT}}{V_{OUT}}$$

In accordance with Eq. (3), Eq. (2) can be simplified as:

$$T_{IDLE} = \frac{I_{PEAK} - 2I_{LOAD}}{2I_{LOAD}} * T_{ON} * \left(\frac{V_{DD}}{V_{OUT}}\right) \quad (4)$$

Many control techniques for buck converters are based on the regulation of two variables: $T_{ON}$ or its counterpart duty cycle D (e.g., where D is $$\frac{T_{ON}}{F_{SW}},$$

where $F_{SW}$ is the switching frequency) and $I_{PEAK}$ the peak current of the inductor current.

Accordingly, Eq. (4) can be re-expressed such that an expression is given with which to control the load current by the modulation of $T_{IDLE}$ for each control technique that regulates at least one of $T_{ON}$ or/and $I_{PEAK}$.

When $I_{PEAK}$ (also referred to herein as $I_{PK}$) is the constrained variable, Eq. (4) can be expressed as:

$$T_{IDLE} = \frac{I_{PK}^2 - I_{LOAD}I_{PK}}{I_{LOAD}} * L * \frac{V_{DD}}{2V_{OUT}(V_{DD} - V_{OUT})} \quad (5)$$

When $T_{ON}$ is the constrained variable, Eq. (4) can be expressed as:

$$T_{IDLE} = T_{ON}^2 * \frac{V_{DD}}{V_{OUT}} * \frac{V_{DD} - V_{OUT}}{2I_{LOAD}L} - T_{ON} * \frac{V_{DD}}{V_{OUT}} \quad (6)$$

In an embodiment, a hysteretic (e.g., and sensorless) PFM constant peak current control technique is used while operating in DCM. In contrast with conventional peak current control solutions, the disclosed hysteretic PFM constant peak current control techniques operate in response to a regulation of the peak current by modulating at least one of the Ton and Toff times in response to $V_{IN}$ and $V_{OUT}$. The Ton and Toff times can be modulated by feeding forward the $V_{IN}$ and $V_{OUT}$ signals to monostable multivibrators (e.g., "one-shots"), which are operable to generate the Ton and Toff times. Modulating at least one of the Ton and Toff times in response to $V_{IN}$ and $V_{OUT}$ obviates the need for (e.g., expensive and/or performance reducing) sensing elements for monitoring and controlling the peak current. (In applications where the $V_{IN}$ is supplied, for example, by a battery, a relatively inexpensive ADC can be used because the voltage potential of the battery changes slowly as a function of the energy usage of the battery.)

In view of FIG. 3, Eq. (3) can be used to derive expressions of $T_{ON}$ and $T_{OFF}$:

$$\begin{cases} \frac{V_{DD} - V_{OUT}}{L}T_{ON} = I_{PEAK} \\ \frac{V_{OUT}}{L}T_{OFF} = I_{PEAK} \end{cases} \rightarrow \begin{cases} T_{ON} = \frac{I_{PEAK}L}{V_{DD} - V_{OUT}} \\ T_{OFF} = \frac{I_{PEAK}L}{V_{OUT}} \end{cases} \rightarrow I_{PEAK}L = \quad (7)$$

$$const. = \alpha \rightarrow \begin{cases} T_{ON} \propto \frac{\alpha}{V_{DD} - V_{OUT}} \\ T_{OFF} \propto \frac{\alpha}{V_{OUT}} \end{cases}$$

Eq. (7) demonstrates, for example, that $T_{ON}$ has an inverse proportionality to $V_{DD}$ and $V_{OUT}$ and $T_{OFF}$ has an inverse proportionality to $V_{OUT}$. Accordingly, monostables are readily designed (e.g., using analog components) for generating variable $T_{ON}$ and $T_{OFF}$ pulses in accordance with the expressions of Eq. (7).

The constant $I_{PEAK}L$ can be calculated a priori (e.g., at design time) to optimize the power conversion (e.g., depending on the design specifications for a specific application). With $I_{PEAK}L$ being determined as a constant (for example), Eq. (7) can be used by circuitry for generating $T_{ON}$ and $T_{OFF}$ while Eq. (5) can be used by circuitry for generating $T_{IDLE}$. Accordingly, an embodiment of the disclosed maximum current limiting techniques is arranged to provide current limiting by modulating the value of $T_{IDLE}$.

$T_{IDLE}$ can be computed during operation (e.g., by relatively robust computing systems using instructions programmed in accordance with Eqs. (5) and (7)). For systems with relatively low computing capabilities, simplifications of such formula are disclosed, which allow to the systems with relatively low computing capabilities to calculate approximate values. The calculated approximate values can be used provide performance capabilities that are substantially equal to values calculated by the relatively complex formula.

In a first simplification, the value of the term $I_{LOADMAX}I_{PEAK}$ is considered to be negligible compared to the value of the term $I_{PK}^2$. When the condition $I_{LOAD} < I_{PK}*((x/100)/2)$ exists (and the term $I_{LOADMAX}I_{PEAK}$ is ignored in the calculation), an error of around x percent is encountered in the calculated value of $I_{PK}^2$ (e.g., which provides results substantially equal to the results that would otherwise be provided when processing in accordance with the entire equation).

In a second simplification, the term $$\frac{V_{DD}}{2V_{OUT}(V_{DD} - V_{OUT})}$$

is assumed to be substantially equal to 1 (e.g., a ratio of unity). For a given $V_{OUT}$, and where the system is supplied with $$V_{DD} = -\frac{2V_{OUT}^2}{1 - 2V_{OUT}},$$

the ratio is equal to 1 (e.g., unity).

Combining the first and second simplifications results in a simpler expression of relationship between $T_{IDLE}$ and the load current:

$$T_{IDLE} = \frac{const.}{I_{LOADMAX}} \text{ with } const. = I_{PEAK}^2 L \quad (8)$$

where $I_{LOADMAX}$ is a maximum allowable load current specified for a given design, and (e.g., accordingly) $I_{PEAK}$ is controlled to be less than or equal to (not greater than) $I_{LOADMAX}$. The units of Eq. (8) would otherwise be "Volt-seconds" but for the ratio of the second simplification, which has units of "per Volts." Accordingly, the units of Eq. (8) are "seconds."

Accordingly, the constant $I_{PK}^2L$ can be readily calculated as the product of the constant $I_{PEAK}L$ and $I_{PEAK}$. Both $I_{PEAK}L$ and $I_{PEAK}$ can be considered to be constants that are defined in the design process of the controller (e.g., both values can be determined by the designer of a specific system). Results of the calculations using the terms $I_{PEAK}L$ and $I_{PEAK}$ can be stored (e.g., before operation of the system) in a LUT (look-up table) "burned" in ROM (or calculated and stored in a generic memory element) and accessed to quickly determine (e.g., calculate) an instantaneous value for $T_{IDLE}$. Components (including memory components) for performing the look up function and receiving the look up function result(s) are considered to be a "processor" (e.g., for converting the look up values into a result used for one or more purposes such as determining the value of $T_{IDLE}$).

Figure 6:
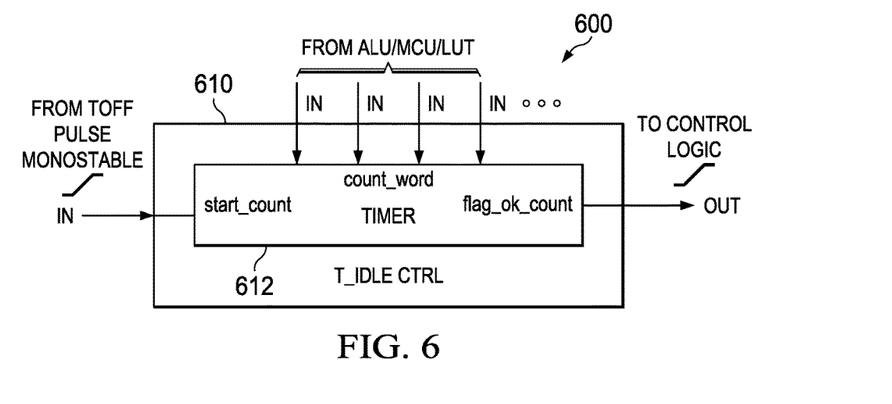
FIG. 6 is a block diagram illustrating a digital idle time controller of maximum load current controller in accordance with example embodiments of the disclosure.
Figure 7:
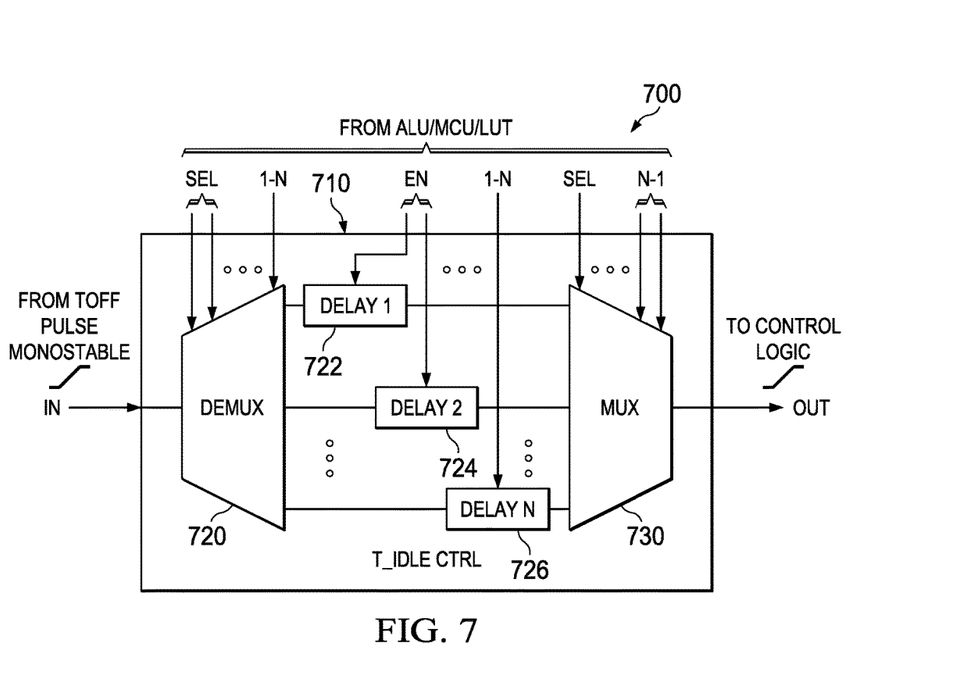
FIG. 7 is a block diagram illustrating an idle time controller of maximum load current controller in accordance with example embodiments of the disclosure.

The calculated $T_{IDLE}$ can be implemented in at least two ways such as a digital delay (see FIG. 6) and/or an analog delay (see FIG. 7). As Eq. (8) indicates, the control technique for current limitation is based on the knowledge of the value of the inductor (e.g., inductor 240). The value of the inductor (e.g., including the effective inductance of the sum of connected components) can be substantially and accurately estimated as discussed below with reference to FIG. 8 and FIG. 9. (The value of the inductor, having a certain tolerance, can also be received as a parameter of a specific design, and used in the calculations of TON, TOFF, and/or T_IDLE for the specific design.)

Figure 4:
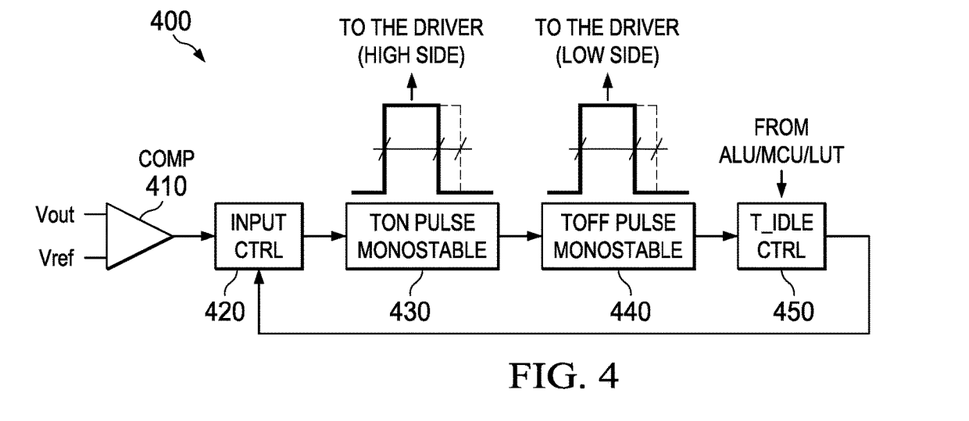
FIG. 4 is a block diagram illustrating a maximum load current controller in accordance with example embodiments of the disclosure.

FIG. 4 is a block diagram illustrating a maximum load current controller in accordance with example embodiments of the disclosure. The maximum load current controller 400 is designed using a comparator 410, which has hysteretic behavior. Due to the hysteretic behavior, the maximum load current controller 400 has two stable states: an idle state (e.g., where the system is "frozen" and the output voltage is equal or greater than the reference voltage), and a regulation phase (e.g., where the output voltage is less than the reference voltage).

In the regulation phase, the TON and TOFF pulses to the power MOSFETs (e.g., switches 220 and 230) are generated. The state decision (e.g., between the idle state and the regulation phase) is determined in response to the comparator 410 tracking the output voltage (e.g., VOUT). VOUT is tracked by comparing VOUT against a reference voltage (VREF). When VREF is less than VOUT, the comparator 410 sends a trigger signal (e.g., by toggling from 0 to 1) to the input controller (INPUT CTRL) 420. In response (e.g., when VOUT<VREF), the pulse generation phase (see FIG. 5) is entered in which the input controller 420 sends a trigger signal to the TON pulse monostable 430.

In response to the trigger signal from the input controller 420, the TON Monostable 430 generates a TON pulse (having a variably controlled pulse width) for the high-side switch (e.g., switch 220), where the pulse width TON is (or has been) determined in accordance with Eq. (7). To help ensure that both the high-side switch and the low-side switch are not closed at the same time (e.g., in which both such switches being closed at the same time would result in a power-to-ground short), a dead-time delay circuit is (e.g., optionally) triggered before closing the low-side switch. When the high-side switch has finished being closed and has opened (e.g., after the end of the TON pulse), the TOFF monostable 440 generates a TOFF pulse (having a variably controlled pulse width) for the low-side switch (e.g., switch 230), where the pulse width TOFF is (or has been) determined in accordance with Eq. (7).

When the low-side switch has finished being closed and has opened (e.g., after the end of the TOFF pulse), the T_IDLE controller (T_IDLE CTRL) 450 is signaled to provide (e.g., generate) a delay (e.g., T_IDLE 326) in accordance with a value calculated for T_IDLE. Accordingly, the variables Ton (e.g., 322), Toff (e.g., 324), and Tidle (e.g., 326) are controllably actuated (e.g., individually selected and toggled at programmable intervals) to help guarantee (e.g., ensure operation in) the DCM condition and to limit/control the maximum output current. The T_IDLE controller 450 can be implemented in accordance with analog and/or digital techniques as discussed below with respect to FIG. 6 and FIG. 7.

When the T_IDLE controller 450 determines the end of the T_IDLE period has been reached, the T_IDLE controller 450 sends a signal to the input controller 420. In response to the notification from the T_IDLE controller 450, the input controller 420 resumes tracking VOUT, and enters the pulse generation phase when VREF is less than VOUT. Accordingly, the maximum load current controller 400 iteratively generates sequences of a TON, TOFF, and T_IDLE delays, where each successive sequence can have a value for one or more variables that is different from the value for the corresponding variables of a previous (and/or successive) sequence.

Figure 5:
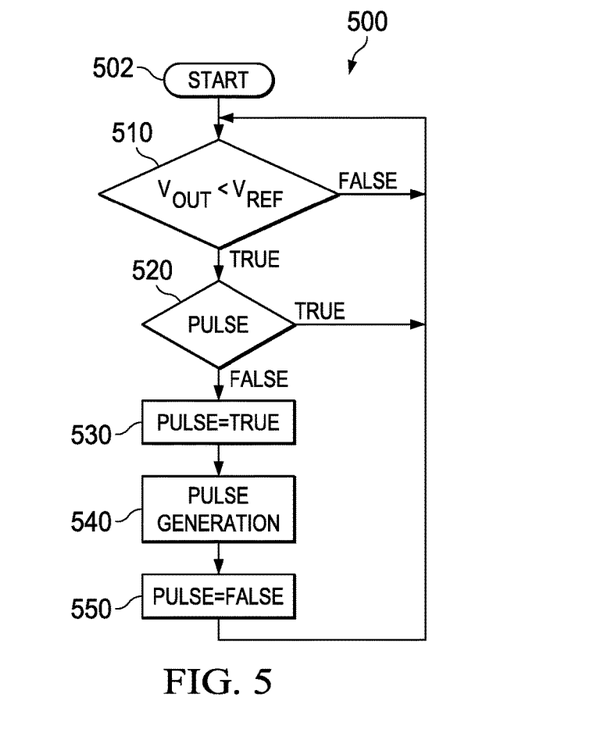
FIG. 5 is a logic flow diagram illustrating operation of a maximum load current controller in accordance with example embodiments of the disclosure.

FIG. 5 is a logic flow diagram illustrating operation of a maximum load current controller in accordance with example embodiments of the disclosure. Program flow 500 begins at program terminal 502 and proceeds to operation 510. In operation 510, the output voltage (e.g., of a power generation system) is compared with a reference voltage to determine whether the output voltage is less than the reference voltage. When the output voltage is not less than the reference voltage, program flow proceeds to operation 510 (e.g., such that the output voltage is evaluated repeatedly until the output voltage is less than the reference voltage). When output voltage is less than the reference voltage, program flow proceeds to operation 520.

In operation 520, the input control logic evaluates the state of pulse generation of the power generation system. For example, when the system is generating an active cycle of power transfer (such as when current flows in the inductor in response to the assertion of TON and TOFF pulses), a "pulse generation" variable is considered to be true. When the pulse generation variable is considered to be true, the input control logic 420 blocks the output of the comparator 410 such that the comparator 410 (e.g., in response to noise) does not send a signal to (e.g., attempt to) trigger a new pulse generation in the middle of a current active cycle (e.g., in which a pulse is currently being generated).

Accordingly, the control logic prevents starting a new active cycle in the middle of a current active cycle and then allows the start of a new cycle should the comparator 410 continue to indicate that the output voltage is less than the reference voltage. Preventing the start of a new active cycle in the middle of a current active cycle helps avoid indiscriminate (e.g., uncontrolled) changes between and amongst CCM (continuous conduction mode) or uncontrolled mixed modes (e.g., which can lead to inefficient use of power, overheating, unregulated output voltages, damage to power supply components, and other such negative outcomes).

When the power generation system is in the middle of a current active cycle (e.g., when the "pulse generation" variable is true), program flow proceeds to operation 510 (e.g., such that the start of a new active cycle in the middle of a current active cycle is prevented). When the power generation system is not in the middle of a current active cycle (e.g., when the "pulse generation" variable is false), program flow proceeds to operation 530.

In operation 530, the variable (e.g., controlled by the input controller 410) "PULSE generation" is set to a true value. Program flow proceeds to operation 540.

In operation 540, the power generation system generates power-switch control pulses (e.g., the T_ON and T_OFF pulses) and enforces the calculated duration of T_IDLE. Program flow proceeds to operation 550.

In operation 550, the variable "PULSE generation" is set to a false value. Program flow proceeds to operation 510, which allows a subsequent active cycle for generation of power-switch control pulses and idle-time enforcement.

FIG. 6 is a block diagram illustrating a digital idle time controller 600 of maximum load current controller 400 in accordance with example embodiments of the disclosure. The idle time (T_IDLE) controller 600 is, for example, a digital implementation of the T_IDLE controller 450. The T_IDLE controller 600 includes digital logic circuitry 610, which further includes a timer 612.

In operation, timer (e.g., counter) 612 starts to count in response to being triggered by the final edge of the $T_{OFF}$ pulse (e.g., the IN signal received from the output of the TOFF monostable 440). The timer 612 counts using an n-bit count-word (e.g., which represents the calculated $T_{IDLE}$ for controlling the output voltage in accordance with a specific maximum load current). The n-bit count-word can be provided by any memory element (e.g., from an LUT), or logic unit element (e.g., including microprocessors, DSP, microcontroller unit, and the like) to the timer 612. When the timer 612 completes the counting process (e.g., reaches a terminal value with respect to the an n-bit count-word), a reset signal is sent to the control logic (e.g., via the OUT signal, which is coupled to the feedback input of the input controller 420).

FIG. 7 is a block diagram illustrating an idle time controller 700 of maximum load current controller 400 in accordance with example embodiments of the disclosure. The idle time (T_IDLE) controller 700 is, for example, an analog implementation of the T_IDLE controller 450. The T_IDLE controller 700 includes variable analog delay block 710, which further includes a demultiplexor (DEMUX) 720, analog delay cells 722, 724, and 726, and multiplexor (MUX) 730.

In operation, a signal generated in response to the final edge of the $T_{OFF}$ pulse (e.g., the IN signal received from the output of the TOFF monostable 440) is first demultiplexed by DEMUX 720 to a selected one of the "n" analog delay cells (e.g., analog delay cells 722, 724, and 726, each cell represents a unique delay). The output of the selected analog delay cell is multiplexed by MUX 730 to generate the OUT signal. The delayed $T_{OFF}$ signal becomes the reset signal for the input controller 420 (e.g., via the OUT signal, which is coupled to the feedback input of the input controller 420). The SEL and EN signals for controlling the variable analog delay block 710 are generated by, for example, the logic unit element that calculates the proper delay and selects the proper analog block to enforce the calculated T_IDLE delay along the signal path (e.g., the delay from the assertion of the signal IN to the assertion of the signal OUT).

Figure 8:
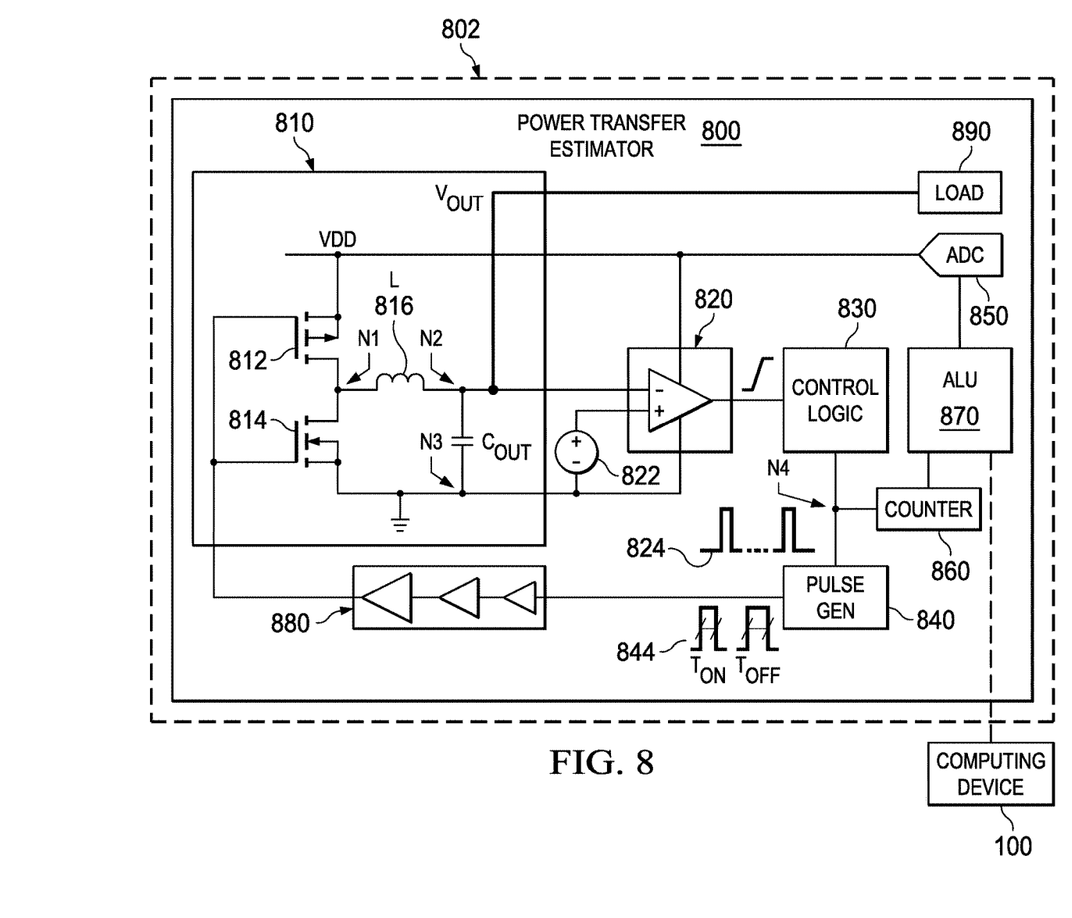
FIG. 8 is a schematic of a power transfer estimator system in accordance with example embodiments of the disclosure.

FIG. 8 is a schematic of a power transfer estimator system 800 in accordance with example embodiments of the disclosure. The power transfer estimator system 800 includes a particular embodiment of the power transfer estimator 138 of FIG. 1, and is optionally formed (e.g., in whole or in part) on a substrate 802. Generally described, the power transfer estimator system 800 comprises a buck converter 810, a comparator 820, a control logic circuit 830, a pulse generator 840, an analog-to-digital converter (ADC) 850, an accumulator such as digital counter 860, an arithmetic logic unit (ALU) 870, and a power MOS driver 880.

The buck converter 810 comprises a high-side PMOS switch 812, a low-side NMOS switch 814, an energy storage element such as inductor 816, and a capacitor Cout. The inductor 816 is coupled between a node N1 and a node N2 (Vout). Node N1 is (e.g., electrically) located between the high-side PMOS switch 812 and the low-side NMOS switch 814, whereas node N2 is located between a high-side terminal of the capacitor Cout and an inverting input of the comparator 820. Node N2 is optionally coupled to a load 890 (which may draw varying amounts of current over time).

In operation of the power estimation system 800, the power switch (e.g., comprising the high-side PMOS switch 812 and the low-side NMOS switch 814) is actuated repeatedly over a series of power cycles, where each power cycle includes an on period, an off period, and an idle period. During the on period, when the high-side PMOS switch 812 is closed and the low-side NMOS switch 814 is opened, the current drawn from the voltage source VDD passes through the node N1, through the inductor 816, through the node N2 (Vout), and branches (e.g., in part) along a first path to the load 890. The drawn current is also branched along a second path from the node N2 to a high-side terminal of the capacitor Cout. Capacitor Cout (which low-pass filters the output of the inductor 816) includes a low-side terminal coupled to ground (via node N3). Node N2 is also coupled to the inverting input of the comparator 820 (which is powered from the power supply rails VDD and ground) while the non-inverting input of the comparator 820 is coupled to the voltage reference 822.

The comparator 820 is operable to compare the voltage of node N2 (Vout) with the voltage generated by the voltage reference 822 to provide the results of the comparison at an input of the control logic circuit 830. When the high-side PMOS switch 812 is opened and the low-side NMOS switch 814 is closed (e.g., when the high-side power switch is open), the voltage at the inverting input of the comparator 820 increases to a level higher than the voltage at the non-inverting input of the comparator 820. In response to the inverting input of the comparator 820 increasing to a level that is higher than the voltage at the non-inverting input of the comparator, the output of the comparator toggles from a logic high state to a logic low state (e.g., to a low logic level state such as a ground level).

When the high-side PMOS switch 812 is closed and the low-side NMOS switch 814 is opened (e.g., when the power switch is closed), the voltage at the inverting input of the comparator 820 decreases to a level that is lower than the voltage at the non-inverting input of the comparator 820. When the voltage at the inverting input becomes less than the voltage of the inverting input, the comparator 820 output transitions to a high logic state.

The control logic circuit 830 detects the transition of the comparator 820 output and generates a pulse 824 for each detected transition. The pulses 824 generated by the control logic circuit 830 are coupled to the pulse generator 840 and the counter 860. The pulse generator 840 is operable to generate the Ton and Toff pulses 844 for controlling the power MOS driver 880 (e.g., to control the voltage level of the buck converter 810 output). In response to (e.g. the Ton) pulses 844, the counter 860 is operable to accumulate (e.g., count) the pulses 824 generated by the control logic 830 over an estimation period for which the power transfer estimation is produced.

The power MOS driver 880 comprises one or more amplifier circuits (for example) coupled in series. The MOS driver 880 includes an input driven by the pulse generator 840 and an output coupled to the control inputs (e.g., the gates) of the high-side PMOS switch 812 and the low-side NMOS switch 814. The Ton and Toff pulses 844 from the pulse generator 840 supply timing information to the power MOS driver 880 for actuating the high-side PMOS switch 812 and the low-side NMOS switch 814.

The analog-to-digital converter (ADC) 850 is coupled to the source voltage VDD and the arithmetic logic unit (ALU) 870. In operation, the ADC 850 converts the amplitude of the source voltage VDD to a digital voltage value and provides the digital voltage value to the ALU 870. The digital counter 860 is coupled (via node N4) to the arithmetic logic unit (ALU) 870. The digital counter 860 generates a switching metric in response to the accumulated pulses 824. The switching metric is coupled to the ALU 870. The ALU 870 is operable to estimate the transfer of power across the power transfer estimator system 800 as discussed immediately below. In various embodiments, a processor of the computing device 100 optionally performs some or all of the functionality of ALU 870.

The charge transferred across the inductor to the battery is equal to the charge transferred during the Ton period 322, which is expressed as:

$$Q_{BATT} = \frac{I_{PEAK} t_{ON}}{2} \quad (9)$$

where $Q_{BATT}$ is the charge transferred from the battery (e.g., being discharged), $I_{PEAK}$ is the maximum current, and $t_{ON}$ is the time on period.

Expressed in terms of inductance and voltage, $Q_{BATT}$ is expressed as:

$$Q_{BATT} = \frac{V_{IN} - V_{OUT}}{2L} t_{ON}^2 \quad (10)$$

However, $t_{ON}$ can be expressed as:

$$t_{ON} = \frac{I_{PEAK} L}{V_{IN} - V_{OUT}} \quad (11)$$

Substituting Eq. 11 for $t_{ON}$ in Eq. 10 yields:

$$Q_{BATT} = \frac{I_{PEAK}^2 L}{2(V_{IN} - V_{OUT})} \quad (12)$$

Certain variables whose values are known before operation (e.g., constants) can be precalculated before operation of the power converter. For example, when the inductance and maximum current are known before operation, a constant reflecting the values of the inductance and capacitance can be expressed as:

$$\alpha = \frac{I_{PEAK}^2 L}{2} \quad (13)$$

where $\alpha$ is a constant whose value can be calculated before operation of a power supply for which the disclosed power transfer techniques are used.

Using the value of $\alpha$ substituted in Eq. 12, a run-time calculation for the amount of charge transferred during operation is expressed as:

$$Q_{BATT} = \frac{\alpha}{V_{IN} - V_{OUT}} \quad (14)$$

Figure 9:
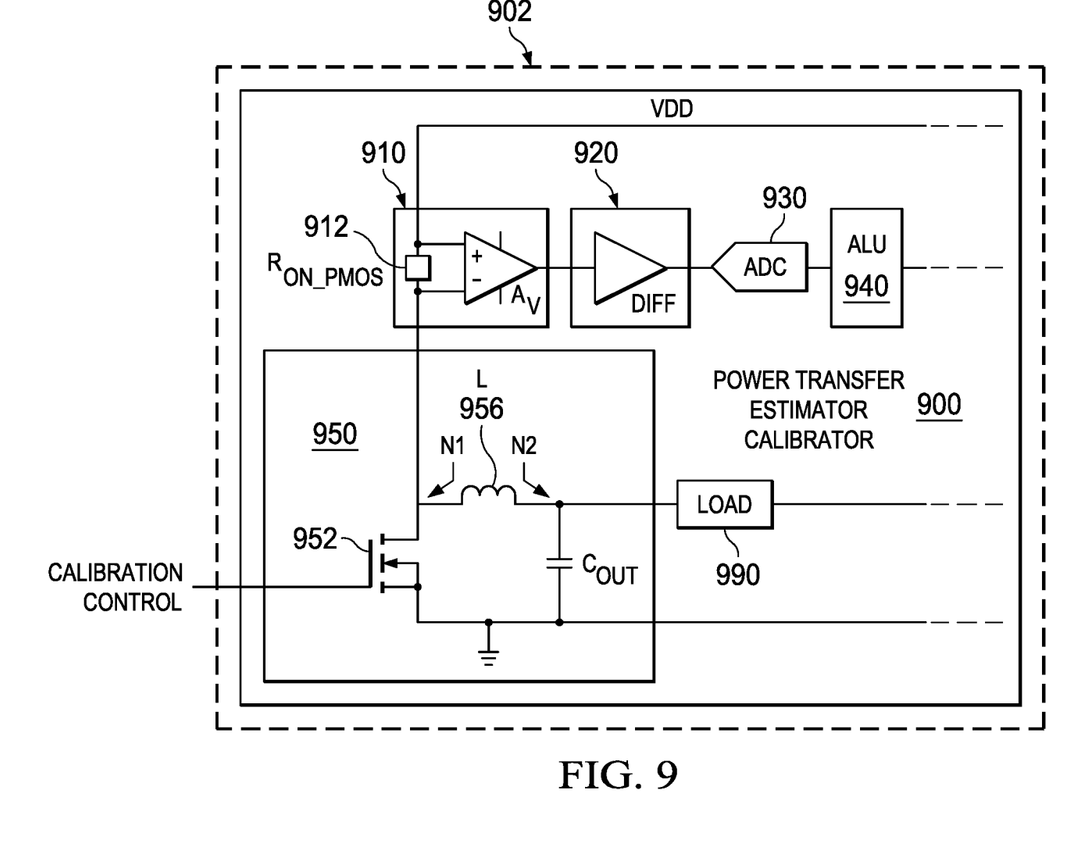
FIG. 9 is a schematic diagram of a power transfer estimator calibrator in accordance with example embodiments of the disclosure.

FIG. 9 is a schematic diagram of a power transfer estimator calibrator in accordance with example embodiments of the disclosure. The power transfer estimator calibrator 900 is an example embodiment of the power transfer estimator 138 of FIG. 1. Generally described, the power transfer estimator calibrator 900 includes a calibration unit 904 and a buck converter 950. The calibration circuitry 904 is formed on a substrate 902 upon which the buck converter 950 is also optionally formed.

The calibration circuitry 904 includes a differential amplifier 910, a differentiator (DIFF) 920, an analog-to-digital converter (ADC) 930, and an arithmetic logic unit (ALU) 940. The calibration circuitry 904 is operable to measure the inductance of inductor 956 of the buck converter 950. The measurement of the inductor 956 can be used to calibrate the power transfer estimator system 800 (e.g., to enhance the accuracy of power transfer estimates made by the power transfer estimator system 800).

The differential amplifier 910 (of calibration circuitry 904) is operable to amplify a sensing signal (e.g., differential voltage) developed across a high-side power switch 912 and functions as a gain stage for the differentiator 920. The high-side power switch 912 is a power switch such as the high-side PMOS switch 912 and is operable to develop the differential voltage in accordance with the on-state drain-to-source resistance ($R_{ON\_PMOS}$) of the high-side power switch 912. The source (e.g., first terminal) of high-side power switch 912 is coupled to the source voltage VDD and to the non-inverting input of the differential amplifier 910. The drain (e.g., second terminal) of the high-side power switch 912, is coupled to node N1 of the buck converter 950 and to the inverting input of the differential amplifier 910.

The output of the differential amplifier 910 is coupled to the input of the differentiator 920. The output of the differential amplifier is a single-ended voltage proportional to the differential voltage developed across the high-side power switch 912 and accordingly is proportional to the inductor current during the time on (Ton) period 322, for example. The differentiator 920 is operable to (e.g., in accordance with differential calculus) differentiate (e.g., to determine the first derivative of) the single-ended input voltage to generate an output signal of the derivative (e.g., slope) of the single-ended input voltage.

The output signal of the differentiator 920 is coupled to the input of the ADC 930. The ADC 930 is operable to convert the derivative of the single-ended input voltage to a digital value, which is in turn, coupled to the ALU 940. As discussed below with respect to the below equations, the ALU 940 is operable to determine the value of the inductor 956 in response to the measured slope of the inductor 956 during a calibration operation in which the buck converter 950 is energized. The ALU 940 optionally provides an indication of the measurement to another device, such as to a computing device 100 for purposes of system maintenance, selection of power modes, user instruction, and the like. (In an embodiment, the ALU 940 can perform a differentiation function digitally using values sampled from the sensing signal over time to determine the measured slope of the inductor 956.)

The buck converter 950 includes a low-side NMOS switch 952, the inductor 956, and a capacitor Cout. The drain of low-side NMOS switch 952 is coupled to an input terminal of the inductor 956 via node N1. In operation (e.g., during a selected period of time during the calibration operation), the high-side power switch 912 is closed for a limited duration of selected length, and current from the voltage source VDD passes through the high-side power switch 912 (e.g., generating the above-mentioned differential voltage) to the input terminal of the inductor 956. The current passed through the high-side power switch 912 energizes the inductor 956. Current from the inductor 956 flows through an output terminal of the inductor 956 (via node N2) to a load 990 and/or the capacitor Cout.

In this embodiment, the power transfer estimator calibrator 900 is operable to calculate the value of inductance L, for example, such that the above-described methods for determining the cumulative charge transfer (e.g., through the buck converter 810 and 950 of a power transfer estimator) can be used without prior knowledge of the inductance L. For example, an integrated circuit (in which the disclosed techniques are programmed and/or formed) can be initially manufactured in relatively large lots and later used in various-sized power converters that include inductors of various values.

The cumulative charge transfer is determined in response to the value of L (e.g., of inductor 952) and the duration of the on time of the high-side power switch 912. The value of L is calculated during a calibration operation by opening the high-side power switch 912 of the sensing for a selected amount of time (Tfix). The selected duration of Tfix is typically on the order of from one to several switching cycle time periods of a DCM power supply in a normal operating mode (e.g., during PWM or PFM operation). The slope of the current flowing through inductor 952 is measured by deriving (e.g., taking the first derivative of) the differential voltage generated across the source and drain of the high-side power switch 912 during the time period Tfix. The derivative is used to calculate the value of L in accordance with the following equations.

The slope is expressed as:

$$\text{Slope} = \frac{\left(\frac{V_{IN} - V_{OUT}}{L} t_{FIX}\right) R_{ON\_PMOS}}{\partial t} = \left(\frac{V_{IN} - V_{OUT}}{L}\right) R_{ON\_PMOS} \quad (15)$$

Eq. 15 expressed in terms of inductance L is:

$$L = \frac{V_{IN} - V_{OUT}}{\text{Slope}} R_{ON\_PMOS} \quad (16)$$

Eq. 16 has one independent variable (inductance L) and accordingly can be "precalculated" with the results being stored in a look-up table (LUT) for fast execution times and/or lower operating power. Eq. 16 expressed in terms of a look-up table is:

$$L_{LUT} = \frac{(V_{IN} - V_{OUT})_{LUT}}{\text{Slope}_{LUT}} R_{ON\_PMOS\_LUT} \quad (17)$$

When only some portions Eq. 17 have been precalculated, the inductance can be determined by the ALU 940 in accordance with the below Eq. 18:

$$L = L_{LUT} = \frac{(V_{IN} - V_{OUT})}{\text{Slope}} \cdot \frac{(\text{Slope})_{LUT}}{(V_{IN} - V_{OUT})_{LUT}} \cdot \frac{R_{ON\_PMOS}}{R_{ON\_PMOS\_LUT}} \quad (18)$$

In an embodiment, a controller (e.g., such as a microcontroller or a digital signal processor) is used to control one or more attributes of the power transfer estimator 138 and other system level controlled variables such as power mode selection and power mode transitioning. The variables are software programmable (e.g., selectable), which allows more flexibility for implementing the disclosed control schemes and provides an enhanced ability to adaptively adjust to dynamically changing conditions for optimized system performance.

In various embodiments, the above described components can be implemented in hardware or software, internally or externally, and share functionality with other modules and components as illustrated herein. For example, the processing and memory portions of the power transfer estimator 138 and/or 140 can be implemented outside of a device and/or substrate upon which the power converter is formed.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A circuit for controlling a load current of a power converter, comprising:
    a first switch to selectively couple an input terminal of an inductor to an input voltage supplied by a voltage source, wherein the inductor includes an output terminal at which an output voltage is developed, wherein the first switch is a MOSFET transistor having a source and a drain;
    a second switch to selectively couple the input terminal of the inductor to a ground;
    a controller configured to generate, for each of a plurality of switching cycles of the power converter, a first pulse having a variable pulse width for actuating the first switch, a second pulse having a variable pulse width for actuating the second switch, and a delay period corresponding to an idle time having a duration in which neither the first switch nor the second switch is actuated, wherein the first pulse, the second pulse, and the idle time are generated sequentially in that order during each switching cycle, and wherein the controller is configured to determine the idle time based on an inverse proportionality relationship with a maximum allowed current of the power converter;
    a differential voltage amplifier coupled to the first switch to generate a single-ended voltage, wherein the differential voltage amplifier has a first input coupled to the source of the first switch and a second input coupled to the drain of the first switch, and wherein the single-ended voltage is generated in response to a voltage developed across the source and the drain of the first switch; and
    a processing unit configured to determine an inductance value of the inductor by dividing a first value by a second value, wherein the first value is an on-state drain-source resistance of the first switch multiplied by a difference between the input voltage and the output voltage, and wherein the second value is a derivative of the single-ended voltage.

2. The circuit of claim 1, wherein the controller is further configured to determine the variable pulse width of the first pulse based on an inverse proportionality relationship with a voltage value equal to the output voltage subtracted from the input voltage and determine the variable pulse width of the second pulse based on an inverse proportionality relationship with the output voltage.

3. The circuit of claim 2, wherein the variable pulse width of the first pulse is determined by dividing the product of the inductance value of the inductor and a peak current through the inductor by the voltage value, and wherein the variable pulse width of the second pulse is determined by dividing the product of the inductance value of the inductor and the peak current through the inductor by the output voltage.

4. The circuit of claim 1, wherein the duration of the idle time is determined based upon a peak current through the inductor, the inductance value of the inductor, and the maximum allowed current of the power converter.

5. The circuit of claim 4, wherein the duration of the idle time is determined by dividing the product of the inductance value of the inductor and the square of the peak current through the inductor by the maximum allowed current of the power converter.

6. The circuit of claim 1, wherein a current through the inductor is controlled during each of the plurality of switching cycles by the first pulse width, the second pulse width, and the idle time.

7. The circuit of claim 1, wherein at least one of the first and second pulses is generated by a monostable multivibrator.

8. The circuit of claim 1, comprising a differentiator to generate the derivative of the singled-ended voltage.

9. The circuit of claim 1, wherein the processing unit includes an arithmetic logic unit (ALU).

10. A power converter, comprising:
a first switch to selectively couple an input terminal of an inductor to an input voltage supplied by a voltage source, wherein the inductor includes an output terminal at which an output voltage is developed, wherein the first switch is a MOSFET transistor having a source and a drain;
a second switch to selectively couple the input terminal of the inductor to a ground; and
a controller configured to generate, for each of a plurality of switching cycles of the power converter, a first pulse having a variable pulse width for actuating the first switch, a second pulse having a variable pulse width for actuating the second switch, and a delay period corresponding to an idle time in which neither the first switch nor the second switch are actuated;
a differential voltage amplifier coupled to the first switch to generate a single-ended voltage, wherein the differential voltage amplifier has a first input coupled to the source of the first switch and a second input coupled to the drain of the first switch, and wherein the single-ended voltage is generated in response to a voltage developed across the source and the drain of the first switch; and
a processor configured to determine an inductance value of the inductor as a ratio of an on-state drain-source resistance of the first switch multiplied by a difference between the input voltage and the output voltage to a derivative of the single-ended voltage.

11. The power converter of claim 10, wherein the variable pulse width of the first pulse is determined based on an inverse proportionality relationship with the difference between the input voltage and the output voltage, and the variable pulse width of the second pulse is determined based on an inverse proportionality relationship with the output voltage.

12. The power converter of claim 11, wherein the variable pulse width of the first pulse is determined in accordance with a ratio of a first value equal to the product of the inductance value of the inductor and a peak current through the inductor to a second value equal to the input voltage minus the output voltage, and wherein the variable pulse width of the first pulse is determined in accordance with a ratio of the first value to the output voltage.

13. The power converter of claim 10, wherein the duration of the idle time is determined in accordance with a ratio of a first value equal to the product of the inductance value of the inductor and the square of a peak current through the inductor to a maximum allowed current of the power converter.

14. The power converter of claim 10, comprising a differentiator to generate the derivative of the singled-ended voltage.

* * * * *